Sept. 26, 1961 H. HYMANS ET AL 3,001,419
OSCILLATION OR INERTIA DAMPER
Filed April 29, 1960
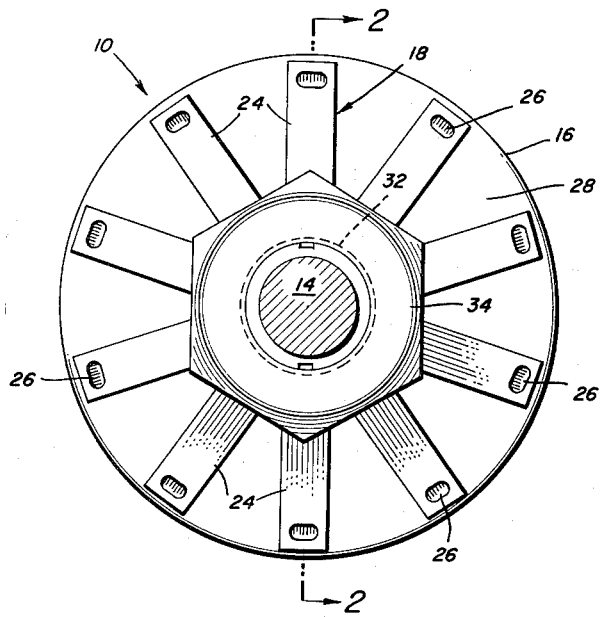
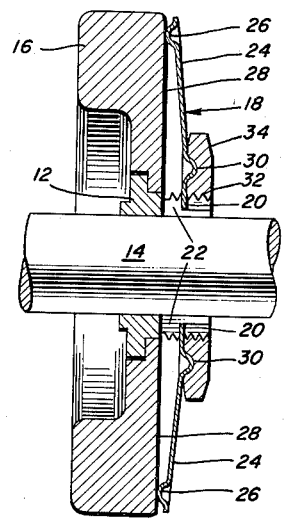
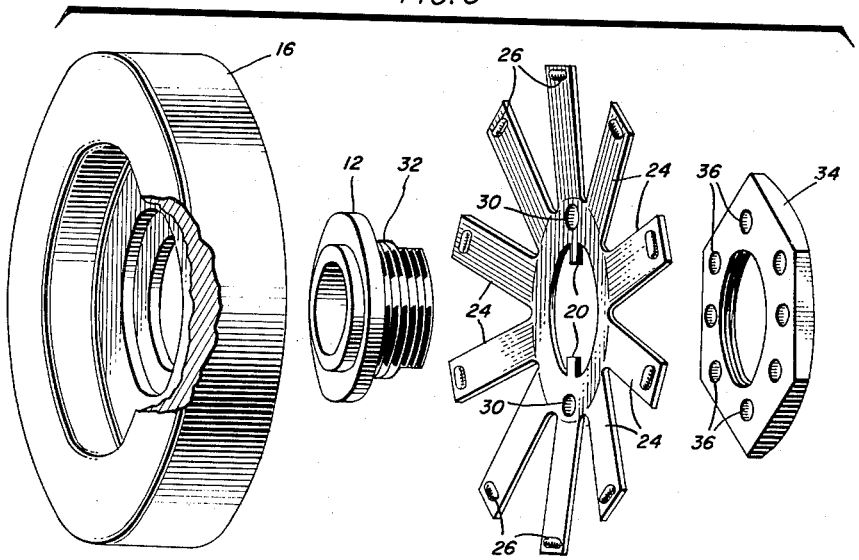
INVENTORS
Harold Hymans
Jafar Devlet-Muraz
BY W. O. Quesenberry
Claude Funkhouser
ATTORNEYS United States Patent Office 3,001,419
Patented Sept. 26, 1961

3,001,419
OSCILLATION OR INERTIA DAMPER
Harold Hymans and Jafar Devlet-Muraz, Paramus, N.J., assignors, by mesne assignments, to the United States of America as represented by the Secretary of the Navy
Filed Apr. 29, 1960, Ser. No. 25,812
3 Claims. (Cl. 74—574)

This invention relates to synchro systems and more particularly to an attachment for damping out oscillations from the output shaft of the synchro receiver.

In a synchro torque system when a transmitter drives a receiver at low angular velocities, the torque developed is not great enough to overcome the synchronizing torque and the synchros remain in step. However, when the angular velocities become large, torques of sufficient magnitude are developed to overcome synchronizing torque and the transmitter no longer has control. The effects of adding moment of inertia, tends to prevent velocities of this size.

It is relatively simple to design and construct a damper for use on synchros that have small or light weight rotors, but to design and construct a damper for use on synchros that have large or heavy rotors has been difficult because of the size and complicated elements of such a damper. Dampers previously used on large size synchros, because of their complexity, have taken considerable time to manufacture and adjust. Although such devices have served the purpose, they have not proved entirely satisfactory either to manufacture or service for the reasons aforementioned.

In the prior art dampers of the type used on large synchros, the dampers were tested in the assembled synchro. This necessitated disassembling the completed synchro when the specified damping time was not met. After disassembly, the damper could be adjusted to compensate for the difference in the damping time and then the synchro would be reassembled and tested again.

The general purpose of this invention is to provide a damper which embraces all the advantages of similarly employed dampers and possesses none of the aforedescribed disadvantages. To obtain this result, the invention contemplates the use of a unique construction which makes it possible to test and make all adjustments on the damper as a subassembly before it is assembled in the sychro thereby obviating the prior art disadvantage of having to test the completed synchro to make certain the specific damping time is attained. This is accomplished by the present invention through the use of a relatively few, easily manufactured parts which are less expensive and of a less complicated nature than the parts of such devices previously used.

An object of the present invention is the provision of an attachment for the output shaft of a synchro receiver for damping out both large and small oscillations from the shaft in a minimum of time.

Another object is to provide an attachment for the output shaft of a synchro receiver wherein the attachment may be assembled, tested and adjusted as a subassembly and then attached directly to the shaft without requiring further adjustment.

Still another object is to provide an attachment for a synchro receiver output shaft which will dampen out both large and small oscillations of said shaft wherein the attachment is adjustable so that the force exerted on the shaft may be changed without disassembling the attachment from the synchro receiver shaft.

Other objects and many of the attendant advantages of this invention will be readily appreciated as the same becomes better understood by reference to the following detailed description when considered in connection with the accompanying drawings wherein:

FIG. 1 illustrates a side elevation of a preferred embodiment of the invention;

FIG. 2 shows a section of the device taken on the line 2—2 of FIG. 1 looking in the direction of the arrows; and FIG. 3 is an exploded perspective view of the invention with parts broken away.

Referring now to the drawings, wherein like reference characters are used to designate like or corresponding parts throughout the several views, there is shown in FIG. 1 a synchro damper 10 having a bushing 12 which is assembled on the shaft 14 of a synchro receiver (not shown). The bushing 12 may be of any suitable material such as stainless steel. A damper wheel 16 is mounted on the bushing 12 and is freely rotatable thereon. A damper spring 18 is mounted on the bushing 12 and has two diametrically opposite keys 20 which engage two keyways 22 cut in the bushing 12. The spring 18 is constructed with a hub and a number of radial fingers 24 integral with the hub and which add flexibility. Indents or buttons 26 of generally elliptical configuration are pressed in these fingers 24 adjacent the outer ends of the fingers rub against the smooth polished surface 28 of damper wheel 16. Two other indents or buttons 30 of spherical configuration are pressed from the hub of the spring in a direction opposite that of buttons 26 and are used for locking the spring in a predetermined position after the spring pressure have been adjusted. In connection with the adjustment of the spring pressure of damper spring 18, the bushing 12 has threads 32 thereon. A lock nut 34 having a number of drilled holes or indentations 36 in its face is threadably mounted on the threaded portion of the bushing 12. The spring pressure of the spring is adjusted by turning the lock nut 34 on the bushing 12 and thereby moving the center portion of the spring 18 toward or away from the damper wheel. The spherical indents 30 on the spring 18 extend into the holes 36 in the lock nut 34 keeping the lock nut from turning during operation of the synchro.

In operation, when the synchro receiver is driven electrically by a synchro transmitter, not shown, the synchro receiver rotor will follow the transmitter rotor. When the transmitter is stopped, the rotor of the receiver will have a tendency to continue to rotate due to its momentum and then will oscillate back and forth for some time until it finally comes to rest. If at the end of the shaft its pointer is attached for indication purposes, any long duration of these oscillations cannot be tolerated.

As the damper wheel 16 is free to rotate around the shaft 14, the inertia of the wheel will cause it to resist the turning movement of the shaft and will damp out the large angular oscillations of the synchro receiver rotor. The friction of the damper spring 18 then functions to damp out the small oscillations or flutters of the rotor and the rotor comes to rest in a minimum of time.

The adjustment of the device is made by turning the lock nut 34 on the bushing 12 either toward or away from the damper wheel 16 such that the spring pressure on the wheel 16 is either increased or decreased. The spherical indents 30 on the spring 18 mate with the holes 36 in the lock nut 34, locking the two members together to prevent movement therebetween so that the attachment 10 will not get out of adjustment during operation of the synchro.

Obviously many modifications and variations of the present invention are possible in the light of the above teachings. It is therefore to be understood that within the scope of the appended claims the invention may be practiced otherwise than as specifically described.

What is claimed is:

1. An attachment for damping both large and small oscillations from a rotor shaft comprising a bushing fixed to said shaft and having a threaded sleeve with a keyway therein, a lock nut threaded onto said sleeve and having a plurality of indentations on the inner face thereof, an inertia member rotatively mounted on said bushing to damp large oscillations from said shaft, concave resilient resilient means having a hub keyed to said sleeve and disposed between said lock nut and said inertia member and a plurality of radially extending resilient fingers, each of said fingers having a button pressed therefrom for engaging said inertia member adjacent the outer periphery thereof to damp out small oscillations of the shaft, said resilient means having a plurality of buttons on said hub and extending in a direction opposite to that of the buttons on said fingers, said buttons being of such configuration as to project into said indentations on said lock nut whereby relative rotation between said lock nut and said hub is normally prevented and tension on said fingers may be adjusted by the rotation of said lock nut to increase or decrease the concavity of said resilient means.

2. An attachment for minimizing oscillations of a rotor shaft and comprising a bushing having a threaded sleeve and fixed to said shaft, an inertia member rotatively mounted on said bushing for damping out large oscillations from said shaft, a concave spring member mounted on said bushing and having a plurality of spring fingers frictionally engaging said inertia member to damp out small oscillations of said shaft, said spring member having a plurality of buttons extending in an axial direction away from said inertia member, and an adjustable lock nut threaded on said sleeve and having a plurality of indentations provided on the inner face thereof for receiving said buttons of said spring member, the number of indentations in said nut being equal to a whole number multiple of the number of buttons on said spring member.

3. An attachment for minimizing oscillations of a rotor shaft and comprising a bushing fixed to said shaft, an inertia member rotatively mounted on said bushing for damping out large oscillations of said shaft, a spring member fixed on said bushing and having a plurality of spring fingers, said spring fingers having button portions adjacent their tips, said button portions frictionally engaging said inertia member to damp out small oscillations of said shaft, and means threadably mounted on said bushing for adjusting the force exerted by said spring on said inertia member, indentations on said threadably mounted means, and means on said spring member engaging said indentations for normally preventing relative rotation between said spring member and said threadably mounted means whereby said spring member can be adjusted to and maintained in a position of desired tension.

References Cited in the file of this patent

UNITED STATES PATENTS

| | | |
|---|---|---|
| 2,338,470 | Urquhart et al. | Jan. 4, 1944 |
| 2,347,059 | Mulheim | Apr. 4, 1944 |
| 2,454,980 | Sobell | Nov. 30, 1948 |
| 2,482,134 | Tice | Sept. 20, 1949 |
| 2,516,698 | Hall | July 25, 1950 |
| 2,527,830 | Lilja | Oct. 31, 1950 |